United States Patent
Hanschke et al.

(10) Patent No.: US 12,018,584 B2
(45) Date of Patent: Jun. 25, 2024

(54) AIRFOIL FOR A COMPRESSOR OF A TURBOMACHINE

(71) Applicant: MTU Aero Engines AG, Munich (DE)

(72) Inventors: Benjamin Hanschke, Munich (DE); Michael Junge, Munich (DE); Astrid Kraus, Munich (DE); Francesca Storti, Munich (DE)

(73) Assignee: MTU Aero Engines AG, Munich (DE)

( * ) Notice: Subject to any disclaimer, the term of this patent is extended or adjusted under 35 U.S.C. 154(b) by 39 days.

(21) Appl. No.: 17/930,012

(22) Filed: Sep. 6, 2022

(65) Prior Publication Data
US 2023/0070018 A1 Mar. 9, 2023

(30) Foreign Application Priority Data
Sep. 8, 2021 (DE) ...................... 10 2021 123 281.3

(51) Int. Cl.
*F01D 5/14* (2006.01)

(52) U.S. Cl.
CPC ...... *F01D 5/141* (2013.01); *F05D 2220/3216* (2013.01); *F05D 2240/301* (2013.01); *F05D 2240/303* (2013.01)

(58) Field of Classification Search
CPC ...... F01D 5/141; F03D 1/0633; F03D 1/0641; B64C 11/18; F05B 2220/32; F05B 2240/301; F05B 2240/303
See application file for complete search history.

(56) References Cited

U.S. PATENT DOCUMENTS

| | | | |
|---|---|---|---|
| 4,431,376 A | * | 2/1984 | Lubenstein ............. F01D 5/141 416/223 R |
| 5,031,313 A | | 7/1991 | Blair et al. |
| 5,439,354 A | | 8/1995 | Hansen et al. |
| 5,480,285 A | | 1/1996 | Patel et al. |
| 6,715,988 B2 | | 4/2004 | Leeke et al. |
| 7,179,058 B2 | | 2/2007 | Chandraker |
| 9,340,277 B2 | * | 5/2016 | Breeze-Stringfellow .................... B64C 11/18 |
| 9,879,539 B2 | * | 1/2018 | Lentz ........................ F01D 5/16 |

(Continued)

FOREIGN PATENT DOCUMENTS

| | | |
|---|---|---|
| CN | 108693030 B | 11/2019 |
| DE | 102004026386 A1 | 12/2005 |

(Continued)

OTHER PUBLICATIONS

Benjamin Hanschke, et al., "The Effect of Foreign Object Damage on Compressor Blade High Cycle Fatigue Strength", Jun. 26-30, 2017, Aug. 17, 2017 (online), Proceedings of ASME Turbo Expo 2017: Turbomachinery Technical Conference and Exposition, pp. 1-9.

(Continued)

*Primary Examiner* — Sang K Kim
(74) *Attorney, Agent, or Firm* — Hinckley, Allen & Snyder, LLP; David R. Josephs

(57) ABSTRACT

The invention relates to an airfoil for a compressor of a turbomachine, which extends starting from a blade root between a leading edge and a trailing edge to a blade tip, wherein the leading edge has a leading-edge thickness and the airfoil has a maximum profile thickness, the ratio of which to each other represents a relative leading-edge thickness, and the airfoil has a leading-edge wedge angle.

8 Claims, 3 Drawing Sheets

(56) References Cited

U.S. PATENT DOCUMENTS

| | | | |
|---|---|---|---|
| 2017/0001710 A1* | 1/2017 | Klein | F04D 29/384 |
| 2018/0073377 A1* | 3/2018 | Hall | F02K 3/06 |
| 2021/0253236 A1* | 8/2021 | Mikic | B64C 29/0033 |

FOREIGN PATENT DOCUMENTS

| | | |
|---|---|---|
| EP | 798447 B1 | 9/2001 |
| EP | 1338799 A1 | 8/2003 |
| EP | 2607628 A2 | 6/2013 |
| EP | 2927427 A1 | 10/2015 |
| EP | 2551657 B1 | 8/2017 |
| EP | 3431707 A1 | 1/2019 |
| EP | 3620610 A1 | 3/2020 |
| EP | 3441566 B1 | 4/2020 |
| EP | 3477055 B1 | 5/2020 |
| WO | 2016173875 A1 | 11/2016 |

OTHER PUBLICATIONS

Seyed Masoud Marandi et al., "Foreign object damage on the leading edge of gas turbine blades", Jan. 15, 2014, Aerospace Science and Technology 33 (2014), pp. 65-75.

"Robust design methodologies: application to compressor blades", Kumar, Apurva, University of Southampton, Faculty of Engineering Science and Mathematics, School of Engineering Sciences, all pages, Nov. 2006.

* cited by examiner

AIRFOIL FOR A COMPRESSOR OF A TURBOMACHINE

BACKGROUND OF THE INVENTION

The invention relates to an airfoil for a compressor of a turbomachine, which extends starting from a blade root between a leading edge and a trailing edge to a blade tip, wherein the leading edge has a leading-edge thickness and the airfoil has a maximum profile thickness, the ratio of which to each other represents a relative leading-edge thickness, and the airfoil has a leading-edge wedge angle.

In a turbomachine, air is sucked in, compressed in a compressor, mixed with fuel in a combustion chamber, and ignited to produce hot combustion gases in order to drive a turbine. Typically, the energy transfer occurs by means of airfoils, which are profiled in such a way that, owing to the surrounding flow, a pressure difference is created between the front side and the back side. Various requirements are paramount in the development of such airfoils. Strength requirements in terms of structural mechanics need to be maintained, such as, for example, a robustness toward any damage due to foreign objects or a stability in regard to alternating load cycles that a material can accommodate before it fails on account of fatigue. In addition, an efficiency and pump surge margin that are as high as possible must be achieved.

These partly contrary requirements of the disciplines involved in the targeted geometry of airfoils oppose one another in a limiting manner. For example, on the basis of aerodynamic considerations, slim airfoil leading edges are preferred, because they contribute to an increase in efficiency. However, geometries of this kind have sensitive regions in regard to structural-mechanics requirements, in particular in regard to any damage due to foreign objects (foreign object damage, FOD). Accordingly, one of the main difficulties in the development of airfoils for compressors consists in providing balanced specifications for the design of a profile contour of such airfoils, taking into account the diverse requirements.

SUMMARY OF THE INVENTION

An object of the invention that ensues from this is to propose an improved airfoil that aims at a high running performance and a long service life.

This is achieved in accordance with the present invention. Advantageous embodiments of the invention are discussed in detail below.

Proposed for achieving this object is an airfoil for a compressor of a turbomachine, which extends starting from a blade root between a leading edge and a trailing edge to a blade tip, wherein the leading edge has a leading-edge thickness and the airfoil has a maximum profile thickness, the ratio of which to each other represents a relative leading-edge thickness. The airfoil has a leading-edge wedge angle. In this case, a product of the relative leading-edge thickness and the leading-edge wedge angle forms, in at least one cross-section of the airfoil, a leading-edge ratio parameter, the value of which is greater than 5.5.

Usually, the airfoil has an essentially concave pressure side and an opposite-lying, essentially convex suction side and is designed to be arranged radially in a compressor. In relation to an arrangement of the airfoil in a compressor of a turbomachine, the airfoil extends axially between an inflow-side leading edge and a trailing edge as well as radially from a blade root to a blade tip. A profile of the airfoil is defined by the shape of the cross-section of the airfoil in the flow direction. Because the leading edge of the airfoil is oriented on the inflow side during operation, the susceptibility to damage due to the inflow of foreign objects is especially high here.

A relative leading-edge thickness ($vkd_{rel}$) is a parameter that characterizes the airfoil and is formed from the ratio of the leading-edge thickness ($d_{LE}$) to a maximum profile thickness ($d_{max}$):

$$\text{relative leading-edge thickness } (vkd_{rel}) = \frac{d_{LE}}{d_{max}}$$

The maximum profile thickness is therefore the largest possible diameter of a circle on a profile centerline of the airfoil. The leading-edge thickness is a circle diameter on the profile centerline of the airfoil in a region of the leading edge. The profile centerline is thus the curve that has the same (cross-sectional) distance at each point to the suction side and pressure side of the profile of the airfoil.

A leading-edge wedge angle ($\alpha_w$) is an angle between a tangent at the suction side and a tangent at the pressure side of the airfoil. In this case, the tangents lie against the points of the suction side and the pressure side at which the circle diameter or the ellipsoidal diameter of the leading-edge thickness transitions to the airfoil profile at the suction side and pressure side. In the scope of the invention, the leading-edge wedge angle is specified in angle degree, whereby an angle degree is an angle measure and corresponds to $\frac{1}{360}$ of a circle. In other words, 1 angle degree is defined as $\frac{1}{360}$ of the full angle; that is, 1 full angle=360°.

Accordingly, the leading-edge ratio parameter ($\vartheta$) is formed as follows:

$$\text{leading-edge ratio parameter } (\vartheta) = vkd_{rel} * \alpha_w$$

The invention is correspondingly particularly based on the idea of specifying a characteristic parameter for an airfoil or for the cross-section profile or geometry of an airfoil, which makes possible an improved contouring of an airfoil leading edge in order to improve its ability to withstand mechanical loads in association with an aerodynamic efficiency of the airfoil. Thus, in the case of an airfoil with a leading-edge ratio parameter greater than 5.5, there ensues a more notch-insensitive geometry of the airfoil than in the case of hitherto known geometries, for which the value of this leading-edge ratio parameter is less than 5.5. In particular, in the case of the correlation between the relative leading-edge thickness and the leading-edge wedge angle in accordance with the invention, the requirements placed both on the structural integrity of the airfoil and on the aerodynamic criteria, such as, for example, a high efficiency and maintaining a pump surge margin, are fulfilled.

In an embodiment of the airfoil, the at least one cross-section of the airfoil lies in a region in which the relative airfoil height is at least 20% of the total airfoil height. The airfoil height extends starting from the blade root, which, in the case of a blisk, for example, corresponds to the region of attachment of the airfoil to the hub shell, to the blade tip. Accordingly, in a region that is spaced apart from the blade root by at least ⅕ of the total airfoil height, a design of the airfoil with a leading-edge ratio parameter greater than 5.5 is advantageous, because, in this way, a configuration of the airfoil that is simultaneously stable and notch-insensitive is achieved.

In an embodiment of the airfoil, the value of the leading-edge ratio parameter in the at least one cross-section of the airfoil is greater than 6, in particular greater than 6.5, and, furthermore, in particular greater than 7. In particular, the value of the leading-edge ratio parameter in at least one cross-section is greater than 5.5; 5.6; 5.7; 5.8; 5.9; 6.0; 6.1; 6.2; 6.3; 6.4; 6.5; 6.6; 6.7; 6.8; 6.9; 7.0; 7.1; 7.2; 7.3; 7.4; 7.5; 7.6; 7.7; 7.8; 7.9; 8.0; 8.1; 8.2; 8.3; 8.4; 8.5; 8.6; 8.7; 8.8; 8.9; 9.0; 9.1; 9.2; 9.3; 9.4; 9.5; 9.6; 9.7: 9.8; 9.9; 10.0 or more. A leading-edge ratio parameter designed in such a way makes possible a design of an airfoil with both a high robustness toward foreign object damage and a high aerodynamic efficiency.

In an embodiment of the airfoil, the at least one cross-section of the airfoil lies in a region in which the relative airfoil height is at least 25%, in particular at least 30%, and, furthermore, in particular at least 40%, in particular at least 50%, and in particular at least 60% of the total airfoil height. In an embodiment, the at least one cross-section of the leading edge hereby lies in a region in which the relative airfoil height is at most 90%, in particular at most 85%, and, furthermore, in particular at most 80%.

In an embodiment of the airfoil in which the leading-edge ratio parameter in at least one cross-section has a proposed value corresponding to the proposed airfoil height spaced apart from the blade root and/or spaced apart from the blade tip, the airfoil can have further or other specific aerodynamic and structural-mechanics properties in at least one other cross-section along the airfoil height. Accordingly, at least in sections along the airfoil height, a high resistance toward foreign object damage is made possible.

In an embodiment of the airfoil, the leading-edge thickness has a value of 0.2 mm to 5 mm. In particular, the leading-edge thickness is 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm, 2.0 mm, 2.1 mm, 2.2 mm, 2.3 mm, 2.4 mm, 2.5 mm, 2.6 mm, 2.7 mm, 2.8 mm, 2.9 mm, 3.0 mm, 3.1 mm, 3.2 mm, 3.3 mm, 3.4 mm, 3.5 mm, 3.6 mm, 3.7 mm, 3.8 mm, 3.9 mm, 4.0 mm, 4.1 mm, 4.2 mm, 4.3 mm, 4.4 mm, 4.5 mm, 4.6 mm, 4.7 mm, 4.8 mm, 4.9 mm, 5.0 mm, where each specified value includes the range to the next specified value.

The design of the airfoil in accordance with the proposed leading-edge ratio parameter also makes it possible in the case of different leading-edge thicknesses of the airfoil to achieve an improved design of the airfoil for a compressor in terms of notch insensitivity.

In an embodiment of the airfoil, the leading-edge wedge angle has a value of 2° to 45°, measured in angle degree. In particular, the leading edge angle is 2°, 3°, 4°, 5°, 6°, 7°, 8°, 9°, 10°, 11°, 12°, 13°, 14°, 15°, 16°, 17°, 18°, 19°, 20°, 21°, 22°, 23°, 24°, 25°, 26°, 27°, 28°, 29°, 30°, 31°, 32°, 33°, 34°, 35°, 36°, 37°, 38°, 39°, 40°, 41°, 42°, 43°, 44°, or 45°, where each specified angle includes the range to the next specified value, that is, in a range of about one (angle) degree.

In the case of a leading-edge wedge angle designed in this way, it is possible for an airfoil designed as proposed to achieve a structural integrity of the airfoil, in particular in relation to a maximum allowable penetration depth of a defined particle.

The invention further also relates an airfoil arrangement for a compressor of a turbomachine that has at least one airfoil according to the invention. In this case, an airfoil arrangement comprises a compressor disk on which a plurality of airfoils are arranged radially. In particular, the airfoils here are attached to the compressor disk in a form-fitting manner or the airfoil arrangement has a plurality of airfoils that are formed in one piece with the compressor disk (blisk). A design of the airfoil arrangement in this way leads to a greater ability to withstand loads as well as to a better aerodynamic efficiency of the airfoil arrangement.

In an embodiment, a compressor has at least one airfoil described herein and/or one airfoil arrangement described herein. The compressor can therefore be designed as a low-pressure compressor or as a high-pressure compressor.

In an embodiment, a turbomachine with a compressor has at least one airfoil described herein and/or one airfoil arrangement described herein. In an embodiment, the airfoils of a plurality of compressor stages, preferably all compressor stages, are designed in accordance with the proposed way.

A use of an airfoil described here in an airfoil arrangement and/or in a compressor and/or in a turbomachine is likewise a subject of the present invention.

BRIEF DESCRIPTION OF THE DRAWING FIGURES

Further features, advantages, and possible applications of the invention ensue from the following description in connection with the figures. Herein:

DESCRIPTION OF THE INVENTION

Figure 1:
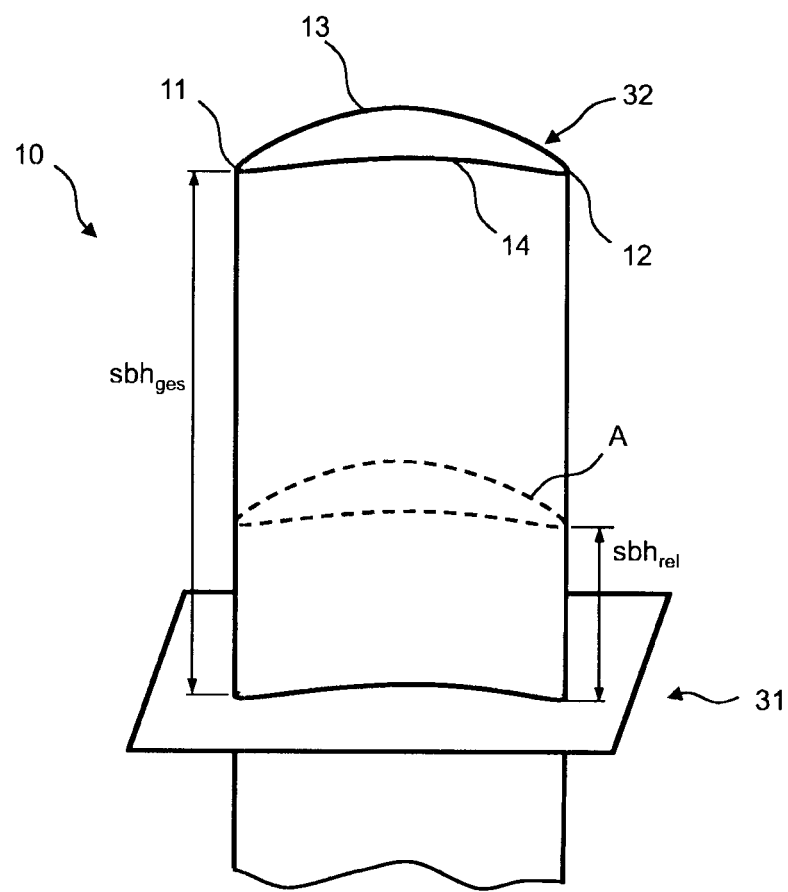
FIG. 1 shows a schematic illustration of an exemplary airfoil according to the invention for a compressor of a turbomachine.

FIG. 1 shows a schematic illustration of an exemplary airfoil 10 for a compressor of a turbomachine. The airfoil 10 extends starting from a blade root 31 between a leading edge 11 and a trailing edge 12 to a blade tip 32. Extending between the leading edge 11 and the trailing edge 12 is a suction side 13 and an opposite-lying pressure side 14 of the airfoil 10.

A relative airfoil height $sbh_{rel}$ is specified starting from the blade root 31. The cross-section A of the airfoil 10 depicted in FIG. 1 lies in a region in which the relative airfoil height $sbh_{rel}$ is greater than 20% of the total airfoil height $sbh_{ges}$. In a cross-section A of the airfoil 10 (in the flow direction), the leading-edge ratio parameter for a proposed design is greater than 5.5.

Figure 2:
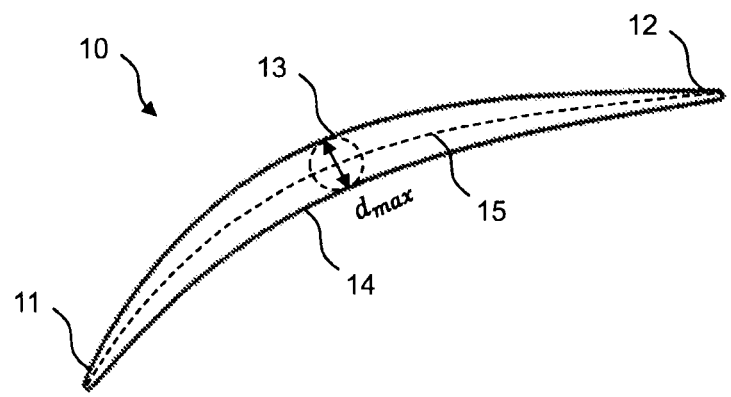
FIG. 2 shows a schematic illustration of a profile in cross-section of an exemplary airfoil according to the invention for a compressor of a turbomachine.

FIG. 2 shows a schematic profile of the airfoil 10 in the flow direction in cross-section A from FIG. 1. In a direction perpendicular to the axis of the drawing, the airfoil 10 extends starting from a blade root 31 to a blade tip 32, which are not depicted here. The airfoil 10 extends between an inflow-side leading edge 11 and a trailing edge 12. The airfoil 10 has essentially a convex suction side 13 and an opposite-lying, essentially concave pressure side 14. At each point to the suction side 13 and to the pressure side 14 of the profile of the airfoil 10, a profile centerline 15 has the same distance, whereby the maximum profile thickness $d_{max}$ represents the largest possible inscribed diameter of a circle on the profile centerline 15 of the airfoil 10.

Figure 3:
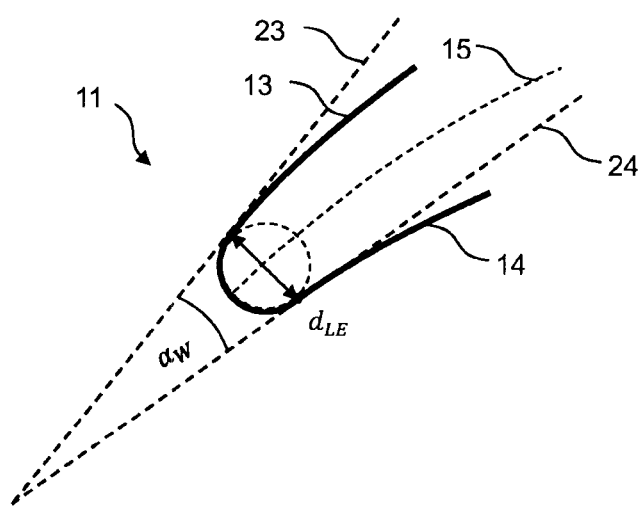
FIG. 3 shows a schematic illustration of a cross-section of a leading edge of an exemplary airfoil according to the invention.

FIG. 3 shows a schematic illustration of the leading edge 11 in cross-section A of the exemplary embodiment of the airfoil 10 from FIG. 2. Depicted in order to highlight the invention is a leading-edge thickness $d_{LE}$ that corresponds to the diameter of a circle on the profile centerline 15 of the airfoil 10 at the leading edge 11. At a point of the suction side 13 at which the diameter of a circle of the leading-edge thickness $d_{LE}$ transitions to the airfoil 10, a suction-side tangent 23 is depicted. At a point of the pressure side 14 at which diameter of a circle of the leading-edge thickness $d_{LE}$ transitions to the airfoil 10, a pressure-side tangent 24 is depicted. At their intersection, the two tangents 23 and 24 form a leading-edge wedge angle $\alpha_w$.

From the leading-edge thickness $d_{LE}$ that is placed in ratio to the maximum profile thickness $d_{max}$ depicted in FIG. 2, a relative leading-edge thickness $vkd_{rel}$ of the airfoil 10 is formed. A product obtained from the thus formed relative leading-edge thickness $vkd_{rel}$ and the leading-edge wedge angle $\alpha_w$ affords a leading-edge ratio parameter $\vartheta$, which characterizes the geometry of the leading edge 11 of the airfoil 10. In the case of the proposed design, the value of this leading-edge ratio parameter $\vartheta$ for an airfoil 10 is greater than 5.5.

Figure 4:
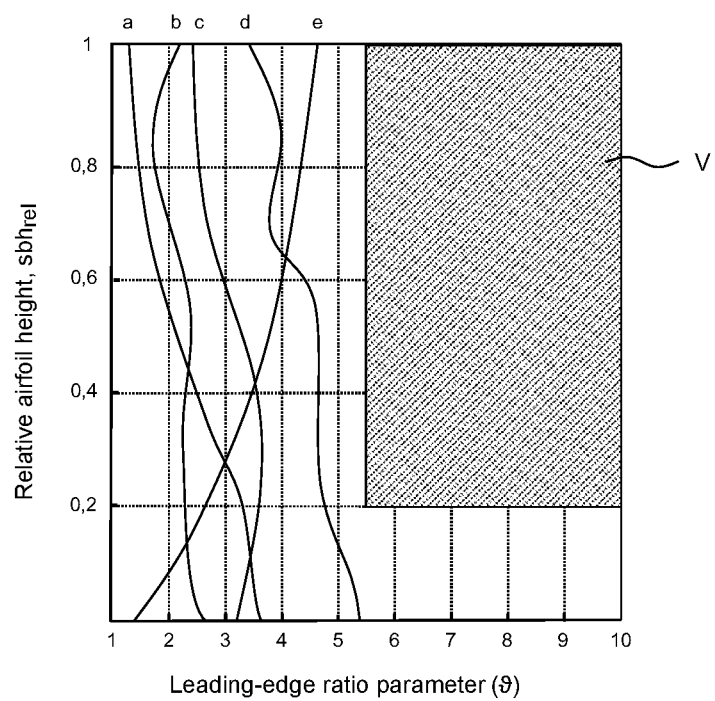
FIG. 4 shows a diagram in which leading-edge ratio parameters of airfoils of the prior art as well as a region V are depicted.

FIG. 4 shows an illustration of a diagram that depicts curves a-e of the correlation between a relative airfoil height $sbh_{rel}$ and a leading-edge ratio parameter for various measured airfoils 10 of the prior art that are not designed in accordance with the invention. The relative airfoil height $sbh_{rel}$ is thereby specified starting from a blade root 31.

Depicted in the diagram is an advantageous region V in which the leading-edge ratio parameter $\vartheta$ is greater than 5.5. A relative airfoil height $sbh_{rel}$ of at least 20%, in particular, from the blade root 31 has been demonstrated to be advantageous in the design of airfoils in order to improve the operating performance and service life for an airfoil 10, in particular in regard to damage from a foreign object.

What is claimed is:

1. An airfoil for a compressor of a turbomachine, which extends starting from a blade root between a leading edge and a trailing edge to a blade tip,
    wherein the leading edge has a leading-edge thickness and the airfoil has a maximum profile thickness, the ratio of the leading-edge thickness to the maximum profile thickness represents a relative leading-edge thickness, and the airfoil has a leading-edge wedge angle,
    wherein a product of the relative leading-edge thickness and a leading-edge wedge angle value, in at least one cross-section of the airfoil, forms a leading-edge ratio parameter, the value of which is between 5.5 and 10.0.

2. The airfoil according to claim 1, wherein the at least one cross-section of the airfoil lies in a region in which the relative airfoil height is at least 20% of the total airfoil height.

3. The airfoil according to claim 1, wherein the value of the leading-edge ratio parameter, in at least one cross-section of the airfoil, is greater than 7.

4. The airfoil according to claim 1, wherein the at least one cross-section of the leading edge lies in a region in which the relative airfoil height is at least 40% of the total airfoil height.

5. The airfoil according to claim 1, wherein the leading-edge thickness has a value of 0.2 mm to 5 mm.

6. The airfoil according to claim 1, wherein the leading-edge wedge angle value has a value of 2° to 45°.

7. A compressor for a turbomachine, comprising at least one airfoil according to claim 1.

8. A turbomachine with a compressor, wherein the compressor is configured and arranged with at least one airfoil according to claim 1.

* * * * *